(12) United States Patent
Kobayashi (10) Patent No.: US 9,432,799 B2
(45) Date of Patent: Aug. 30, 2016

(54) PROXIMITY COMMUNICATION SYSTEM AND PROXIMITY COMMUNICATION APPARATUS

(71) Applicant: Yamaha Corporation, Hamamatsu-shi, Shizuoka (JP)

(72) Inventor: Nobuyuki Kobayashi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 14/428,080

(22) PCT Filed: Sep. 6, 2013

(86) PCT No.: PCT/JP2013/074149
§ 371 (c)(1),
(2) Date: Mar. 13, 2015

(87) PCT Pub. No.: WO2014/042101
PCT Pub. Date: Mar. 20, 2014

(65) Prior Publication Data
US 2015/0256965 A1 Sep. 10, 2015

(30) Foreign Application Priority Data
Sep. 13, 2012 (JP) .................................. 2012-201288

(51) Int. Cl.
*H04B 7/15* (2006.01)
*H04W 4/00* (2009.01)
(Continued)

(52) U.S. Cl.
CPC .............. *H04W 4/008* (2013.01); *G06K 17/00* (2013.01); *H04B 5/0006* (2013.01);
(Continued)

(58) Field of Classification Search
CPC ... H04W 4/008; H04W 12/06; H04W 88/04; H04B 7/15; H04B 5/0037

USPC ............................ 455/41.1, 41.2, 41.3, 11.1
See application file for complete search history.

(56) References Cited

U.S. PATENT DOCUMENTS 9,047,759 B2 * 6/2015 Yamada ................. G08C 17/02
2009/0052348 A1 2/2009 Kato et al.
(Continued)

FOREIGN PATENT DOCUMENTS

JP 2004-234162 A 8/2004
JP 2009-135865 A 6/2009
(Continued)

OTHER PUBLICATIONS

International Search Report (PCT/ISA/210) dated Nov. 12, 2013, with English translation (four (4) pages).
(Continued)

*Primary Examiner* — Md Talukder
(74) *Attorney, Agent, or Firm* — Crowell & Moring LLP (57) ABSTRACT

A proximity communication system includes: a first device (mobile terminal device) including a first proximity communication section performing proximity communication; a second device (stationary device) including a first high-speed communication section performing high-speed communication faster than the proximity communication; and a third device (charger) including: a second proximity communication section performing proximity communication; a second high-speed communication section performing high-speed communication; a storage section in which authentication information for authenticating the first device is stored; and a control section authenticating the first device by using the authentication information when the second proximity communication section starts communication with the first device and relaying communication between the first device and the second device by using the second proximity communication section and the second high-speed communication section in a case that the authentication is successful.

4 Claims, 9 Drawing Sheets

(51) Int. Cl.
*G06K 17/00* (2006.01)
*H04M 1/00* (2006.01)
*H04W 16/26* (2009.01)
*H04W 84/10* (2009.01)
*H04B 5/00* (2006.01)
*H04W 12/06* (2009.01)
*H04W 88/04* (2009.01)

(52) U.S. Cl.
CPC ......... *H04B 5/0031* (2013.01); *H04B 5/0037* (2013.01); *H04B 5/0075* (2013.01); *H04B 7/15* (2013.01); *H04M 1/00* (2013.01); *H04W 12/06* (2013.01); *H04W 16/26* (2013.01); *H04W 84/10* (2013.01); *H04M 2250/04* (2013.01); *H04W 88/04* (2013.01)

(56) References Cited

U.S. PATENT DOCUMENTS

| | | | |
|---|---|---|---|
| 2009/0231125 A1* | 9/2009 | Baldus | A61B 5/0006 340/539.12 |
| 2010/0283586 A1 | 11/2010 | Ikeda et al. | |
| 2011/0117844 A1* | 5/2011 | Fujita | H04B 7/155 455/41.2 |
| 2011/0294422 A1* | 12/2011 | Fuchs | H04L 63/18 455/1.2 |
| 2012/0171952 A1* | 7/2012 | Ohira | H04M 1/72525 455/41.1 |
| 2013/0196591 A1* | 8/2013 | Ikeda | H04N 1/00007 455/11.1 |
| 2013/0231051 A1* | 9/2013 | Naruse | G06F 3/1204 455/41.2 |
| 2013/0247117 A1* | 9/2013 | Yamada | G08C 17/02 725/93 |
| 2015/0256965 A1* | 9/2015 | Kobayashi | G06K 17/00 455/11.1 |

FOREIGN PATENT DOCUMENTS

| | | |
|---|---|---|
| JP | 2010-218417 A | 9/2010 |
| JP | 4887431 B2 | 2/2012 |

OTHER PUBLICATIONS

Japanese-language Written Opinion (PCT/ISA/237) dated Nov. 12, 2013 (four (4) pages).

Japanese Office Action Issued in counterpart Japanese Application No. 2012-201288 dated Jun. 14, 2016 with English translation (10 pages).

* cited by examiner

PROXIMITY COMMUNICATION SYSTEM AND PROXIMITY COMMUNICATION APPARATUS

TECHNICAL FIELD

The present invention relates to a proximity communication system and a proximity communication apparatus for facilitating proximity communication between devices, for example, between a mobile device and a stationary device.

BACKGROUND ART

Proximity communication referred to as NFC (Near Field Communication) has been put into practical use. Numerous systems using this proximity communication have been proposed in which a mobile terminal device, such as a mobile phone, is brought close to a stationary device, and the mobile terminal device performs proximity communication with the stationary device, thereby making the stationary device perform operation corresponding to the mobile terminal device (for example, Patent Document 1).

Patent Document 1 describes a system in which when a mobile terminal device is brought close to a multi-functional printer, Bluetooth (registered trademark) pairing information is transmitted from the multi-functional printer to the mobile terminal device by using proximity communication, and the mobile terminal device transmits print data to the multi-functional printer by using Bluetooth, thereby making the multi-functional printer perform printing.

PRIOR ART DOCUMENT

Patent Document

Patent Document 1: JP-A-2009-135865

SUMMARY OF THE INVENTION

Problem that the Invention is to Solve

Proximity communication is communication to be performed in a state in which two devices communicating with each other are brought very close to each other, approximately 0 to 10 cm; with this communication, although one-to-one communication is easily achieved, the devices are required to be brought literally close to each other, that is to say, in the example of Patent Document 1, a mobile terminal device is required to be brought close to a stationary device; hence, the mobile terminal device cannot make the stationary device perform functions by using proximity communication from a remote place.

The present invention is intended to provide a proximity communication system and a proximity communication apparatus capable of performing proximity communication from a place away from a stationary device.

Means for Solving the Problem

The proximity communication system according to the present invention comprises: a first device (mobile terminal device) which includes a first proximity communication section which is configured to perform proximity communication; and a third device (charger) which includes: a second proximity communication section which is configured to perform proximity communication; a high-speed communication section which is configured to perform high-speed communication faster than the proximity communication; a storage section in which authentication information for authenticating the first device is stored; and a control section which is configured to authenticate the first device by using the authentication information when the second proximity communication section starts communication with the first device, and which is configured to relay communication between the first device and a second device by using the second proximity communication section and the high-speed communication section in a case that the authentication is successful.

In the above-mentioned invention, when the communication between the first device and the second device is relayed by the third device, a control section of the first device may transmit, to the second device via the third device, at least one of operation information indicating an operation state at a time when the communication between the first device and the second device is relayed by the third device and setting information indicating a function setting state at the time, when receiving the at least one of the operation information and the setting information, a control section of the second device may start operation based on the received information, and the control section of the first device may stop operation based on the information transmitted to the second device.

The proximity communication apparatus according to the present invention comprises: a proximity communication section which is configured to perform proximity communication; a high-speed communication section which is configured to perform high-speed communication faster than the proximity communication; a storage section in which authentication information for authenticating a mobile terminal device that communicates with the proximity communication section is stored; and a control section which is configured to authenticate the mobile terminal device by using the authentication information when the proximity communication section starts communication with the mobile terminal device, and which is configured to relay, by using the proximity communication section and the high-speed communication section, communication between the mobile terminal device that communicates with the proximity communication section and a second device that communicates with the high-speed communication section in a case that the authentication is successful.

In the above-mentioned invention, the proximity communication apparatus may further comprise: a power transmission section which is configured to wirelessly supply power to the mobile terminal device that communicates with the proximity communication section.

In addition, according to the invention, there is provided a method of controlling a proximity communication apparatus including: a proximity communication section which is configured to perform proximity communication; a high-speed communication section which is configured to perform high-speed communication faster than the proximity communication; and a storage section in which authentication information for authenticating a mobile terminal device that communicates with the proximity communication section is stored, the method comprising: authenticating the mobile terminal device by using the authentication information when the proximity communication section starts communication with the mobile terminal device; and relaying, by using the proximity communication section and the high-speed communication section, communication between the mobile terminal device that communicates with the proximity communication section and a second device that communicates with the high-speed communication section in a case that the authentication is successful.

Advantage of the Invention

With the present invention, the first device can perform communication similar to the direct proximity communication performed between the first device and the second device by performing proximity communication with the third device, whereby the first device can substantially perform proximity communication at a place away from the second device.

MODE FOR CARRYING OUT THE INVENTION

An audio system according to an embodiment of the present invention will be described referring to the drawings.

Figure 1:
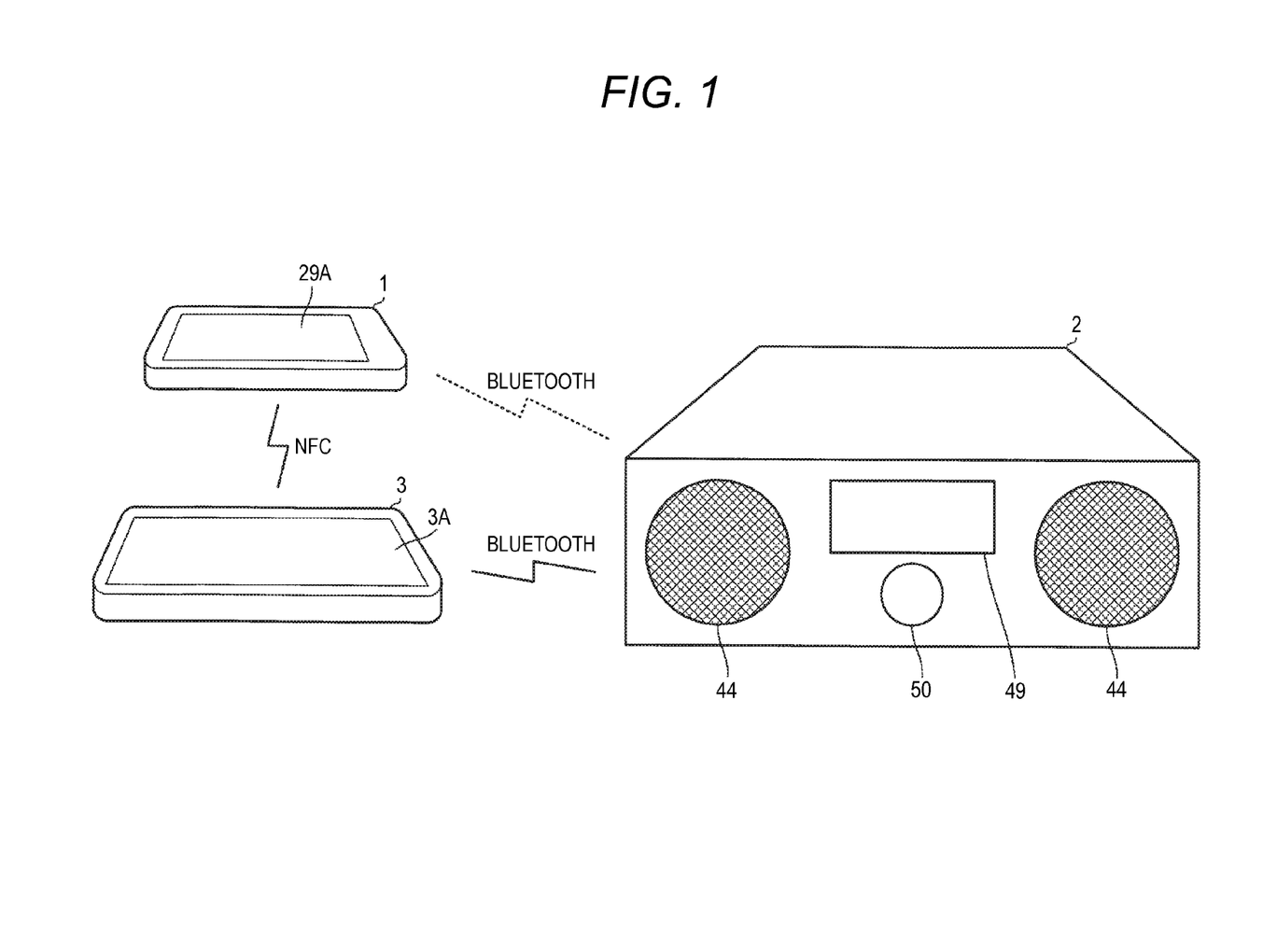
FIG. 1 is a view showing a configuration of an audio system according to an embodiment of the present invention.

FIG. 1 is a view showing a system configuration of an audio system. The audio system includes a mobile terminal device 1, a master set 2 serving as a stationary device, and a charger 3. A multi-functional mobile phone (the so-called smart phone) is suitable as the mobile terminal device 1. Furthermore, an all-in-one audio device, referred to as the so-called desk top audio system, incorporating an amplifier, a speaker, a tuner and a CD player is suitable as the master set 2. The charger 3, provided as a tray on which the mobile terminal device 1 is placed, charges the battery of the mobile terminal device 1 through noncontact power transmission (WPC) and intermediates the communication between the mobile terminal device 1 and the master set 2 by serving as the slave set (satellite) of the master set 2.

The portable terminal device 1 is equipped with a 3G/4G mobile phone communication function and is also equipped with a plurality of communication functions, such as Wi-Fi, Bluetooth, NFC (Near Field Communication). Wi-Fi is herein a wireless LAN communication standard specified in IEEE 802.11. Bluetooth is a communication standard according to which short range communication of approximately 10 to 100 m is performed using a 2.4 GHz band. The communication speed thereof is approximately 2 Mbps at the maximum. NFC is a communication standard according to which very close proximity wireless communication of approximately 10 cm is performed and a communication speed of approximately 200 kbps is possible using electromagnetic induction at 13.56 MHz.

NFC corresponds to the proximity communication of the present invention. Since the communicable distance of NFC is very short, one-to-one communication is ensured and crosstalk among three devices does not occur, whereby NFC is a communication system in which the setting for establishing communication is simple. However, NFC is an example, and a system other than NFC may also be used, provided that the system is a very close proximity communication system in which only the charger 3 to which the user intentionally brings the mobile terminal device 1 close can perform communication even if a plurality of chargers 3 are located at the same place.

A communication coil 22 for NFC and a power-receiving coil 23 for noncontact power transmission (WPC) are built in the back face of the housing of the mobile terminal device 1. The noncontact power transmission is a technology for transmitting power in a non-contact manner using a system such as electromagnetic induction, electric field coupling or resonance coupling; for example, in the case of the electromagnetic induction system, a power of approximately 12 W is transmitted from a power-transmitting coil to a power-receiving coil by using an electromagnetic wave having a frequency of approximately 100 to 200 kHz.

The mobile terminal device 1 has an alarm function, a mail transmitting/receiving function, a function for reproducing music files, such as MP3 files, a radio (simultaneous) broadcast receiving function, a television (one-segment) broadcast receiving function, etc. as basic functions.

The charger 3 has the shape of a tray on which the mobile terminal device 1 is placed, and includes a placement section 3A on its upper face. The placement section 3A is provided as a place on which the mobile terminal device 1, being carried in a pocket or a bag by the user and taken out from the pocket or the bag, is placed. The charger 3 is not required to be placed in the vicinity of the master set 2 but may merely be placed in the communication range (for example, 10 m: class 2) of Bluetooth. The charger 3 has a communication coil 68 for NFC and a power-transmitting coil 69 for the noncontact power transmission on the back side of the placement section 3A.

The master set 2 has, for example, a Bluetooth communication function, a music file reproduction function, a radio broadcast receiving function, and a CD reproducing function. The master set 2 communicates with the mobile terminal device 1 or the charger 3 via Bluetooth.

When the mobile terminal device 1 is placed on the placement section 3A of the charger 3, the mobile terminal device 1 starts communication with the charger 3 via NFC. At this time, the charger 3 performs authentication for the mobile terminal device 1. In the case that the mobile terminal device 1 is authenticated as a device, the charger 3 starts charging, and in the case that the mobile terminal device 1 is authenticated as a registered device (user), the charger 3 performs the following: (1) relays the communication to the master set 2 or (2) transmits the pairing information of the master set 2 to the mobile terminal device 1. As a result, the mobile terminal device 1 can communicate with the master set 2.

The vender code, model code, etc. of the mobile terminal device 1 may merely be used for model authentication. The information on these is referred to as model identification information. In addition, authentication as to whether the mobile terminal device 1 has been registered may merely be performed according to the unique number (serial number or the like), the telephone number, the numbered user name, the user's date of birth, the numerical value or character string arbitrarily set by the user, etc., assigned to the mobile terminal device 1. Information on these is hereafter referred to as individual identification information.

Once communication is made possible, the mobile terminal device 1 communicates with the master set 2 as described below. The mobile terminal device 1 transmits operation information and setting information to the master set 2. The master set 2 starts operation by inheriting the operation information and the setting information. The operation information is information indicating the current operation state of the mobile terminal device 1 and including information on the audio source being reproduced. For example, the information includes the file name of the music file being reproduced, the name of an album (the name of a music selection list), timing information during reproduction, information on the radio station or television station providing the broadcast being received, etc. More specifically, the information includes the total number of tracks, the total time, the number of the track being reproduced, time information during reproduction, etc. for the album (music selection list) being reproduced. In addition, in the case that the mobile terminal device 1 receives a broadcast, the operation information may include, for example, the station information or the URL information on the radio/television broadcast station providing the broadcast being reproduced. The setting information is, for example, information on the setting of alarm time.

Operations to be inherited by the master set 2 on the basis of the above-mentioned information are, for example, those described below.

In the case that the mobile terminal device 1 is in the course of reproducing a music file, the master set 2 starts the reproduction of the same music file. In this case, the master set 2 starts the reproduction at the timing synchronized with the reproduction in the mobile terminal device 1.

In the case that the mobile terminal device 1 is in the course of receiving a radio broadcast or a television broadcast, the master set 2 starts the reception and reproduction of the same broadcast. In the case that the master set 2 having no television broadcast receiving function is connected to a television set via, for example, HDMI (registered trademark), the viewing of the same broadcast may be started by controlling the television set by using HDMI/CEC. Furthermore, the master set 2 is not limited to an all-in-one audio device, but may be a component type device.

In the case that an alarm has been set in the mobile terminal device 1, the master set 2 sets a similar alarm to the device itself, whereby when the preset time has been reached, an alarm sound is generated or the reception of a television broadcast or a radio broadcast is started.

In the case that the mobile terminal device 1 is a mobile phone, the mobile phone notifies the master set 2 of telephone call arrival or mail reception, and the master set 2 generates a call arrival sound or a mail reception sound. As a result, even if the mobile terminal device (mobile phone) 1 is in the manner mode, the call arrival or the mail reception can be notified to the user.

The configurations of the mobile terminal device 1, the master set 2 and the charger 3 will be described below referring to the block diagrams.

Figure 2:
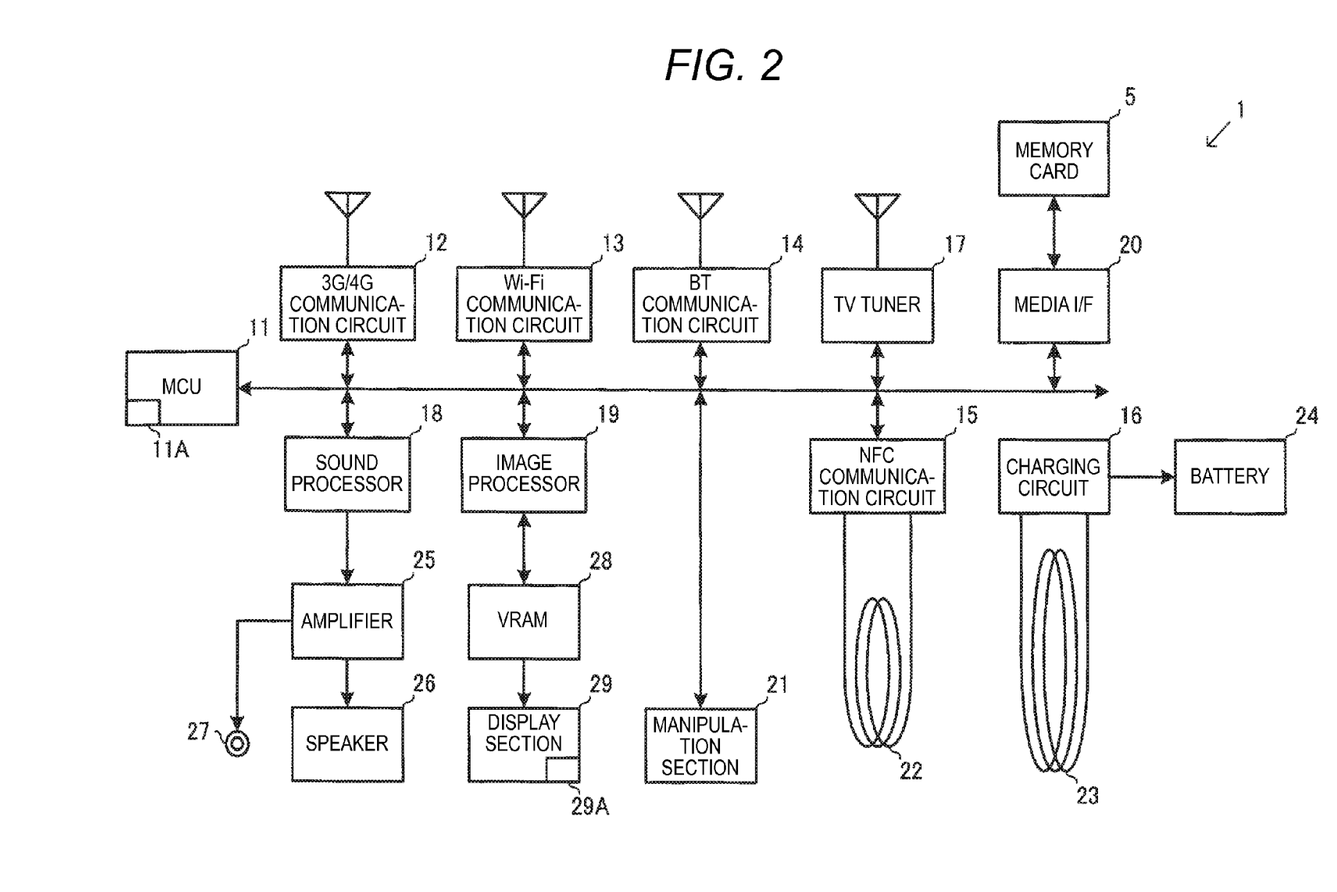
FIG. 2 is a block diagram showing a mobile terminal device of the audio system.

FIG. 2 is a block diagram showing the mobile terminal device 1. As described above, in this embodiment, the mobile terminal device 1 is a multi-functional mobile phone (smart phone). In the mobile terminal device 1, a 3G/4G communication circuit 12, a Wi-Fi communication circuit 13, a Bluetooth communication circuit 14, an NFC communication circuit 15, a charging circuit 16, a TV (one-segment) tuner 17, a sound processor 18, an image processor 19, a media interface 20, and a manipulation section 21 are connected to an MCU 11 serving as a control section. In addition, the MCU 11 incorporates a memory 11A. The above-mentioned model identification information and individual identification information are stored in the memory 11A.

The 3G/4G communication circuit 12 is a circuit for performing voice communication and data communication by using the third/fourth generation mobile communication network. The Wi-Fi communication circuit 13 performs wireless LAN communication according to the IEEE 802.11 standard. The Wi-Fi communication circuit 13 performs communication in two modes: infrastructure mode in which a plurality of Wi-Fi devices perform communication via a wireless access point controlling the network but do not directly communicate with one another and ad-hoc mode in which a plurality of Wi-Fi devices directly communicate with one another. The Bluetooth communication circuit 14 is a communication circuit for performing PNP communication with a preset communication partner via Bluetooth (IEEE 802.15.1). Bluetooth is mainly used to transmit, for example, character information and digital sound signals to and from a partner device.

The NFC communication circuit 15 has the communication coil 22 for generating a magnetic flux using a 13.56 MHz high-frequency current. In NFC, the communication coils of two communicating devices are opposed to each other, the 13.56 MHz carrier current modulated by a signal is passed through the transmitting-side coil, whereby a mutual induction current modulated by the signal is generated in the receiving-side coil. Furthermore, power can also be transmitted to the receiving-side coil by passing a strong current to the transmitting-side coil. The NFC communication circuit on the receiving side can be made on standby without standby power by starting the communication circuit on the receiving side by using this power.

The NFC communication circuit 15 can operate in three modes: card emulation mode, reader/writer mode and P2P mode. Since the NFC communication circuit 15 incorporates a mode switch, the operation mode is switched to one of the above-mentioned three modes in accordance with the situation.

The card emulation mode is a mode in which the device functions as a non-contact IC card and can communicates with the reader/writer of a non-contact IC card. The reader/writer mode is a mode in which reading/writing of data on a non-contact IC card can be achieved. In the case that an NFC device being in the card emulation mode approaches an NFC device being in the reader/writer mode, the NFC device being in the reader/writer mode detects the NFC device being in the card emulation mode and starts communication.

In addition, the P2P mode is a mode in which peer to peer communication is achieved between NFC devices. In the P2P mode, various kinds of information can be exchanged directly between the NFC devices.

Figure 4:
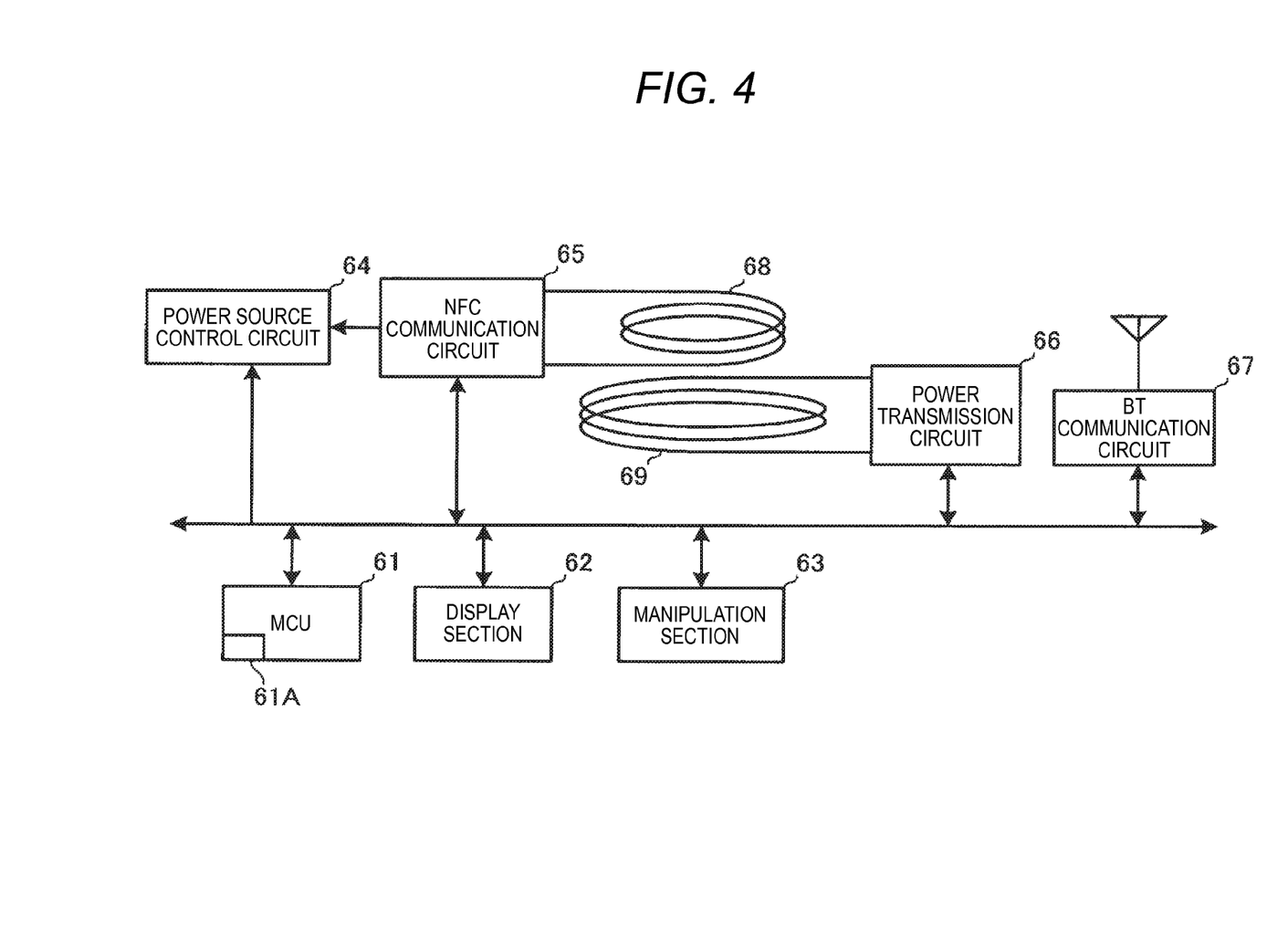
FIG. 4 is a block diagram showing a charger of the audio system.

With this embodiment, the NFC communication circuit 15 of the mobile terminal device 1 is set to the reader/writer mode by default. Furthermore, the NFC communication circuit 65 of the charger 3, described later, is set to the card emulation mode by default. As a result, when the mobile terminal device 1 is placed on the placement section 3A of the charger 3, the NFC communication circuit 15 detects the NFC communication circuit 65 and starts communication. The default setting of the NFC communication circuit 15 and that of the NFC communication circuit 65 may be reversed. Furthermore, the NFC communication circuit 15 and the NFC communication circuit 65 may initially be set to the P2P mode.

The charging circuit 16 is a circuit for charging a built-in battery 24. The charging circuit 16 has the power-receiving coil 23 to receive the supply of power by noncontact power transmission. The power-receiving coil 23 is provided on the back face side of the housing so as to be coaxial with the communication coil 22. With WPC serving as a typical standard for noncontact power transmission, a power of approximately 12 W can be transmitted using an electromagnetic wave having a frequency of approximately 100 to 200 kHz.

The TV tuner 17 receives a television (one-segment) broadcast. The received image and sound are input to the sound processor 18 and the image processor 19.

The sound processor 18 is a processing section for expanding a compressed digital sound signal and converting the signal into a bit stream sound signal. The sound processor 18 performs processing, such as the processing of speech voice and the reproduction of digital music files, in addition to the processing of the sound of television broadcasts. The sound processor 18 inputs a reproduced sound signal to an amplifier 25. The amplifier 25 amplifies the input sound signal and outputs the sound signal to a speaker 26 and to an earphone terminal 27.

The image processor 19 expands compressed television broadcast moving images, image files, etc. to display size images and writes them in a VRAM 28. The images developed in the VRAM 28 are output to the display section 29. The display section 29 includes the display 29A provided on the front face of the mobile terminal device 1 and displays the images input from the image processor 19 on the display 29A.

The manipulation section 21 includes the touch panel formed on the surface of the display 29A, detects the manipulation performed by the user, and transmits the manipulation to the MCU 11. The media interface 20 has a memory card slot, and a memory card 5 is connected thereto. The memory card 5 is, for example, a micro SD card, in which, for example, a plurality of music files, i.e., compressed digital sound signals to be output to the above-mentioned sound processor 18, are stored.

Figure 3:
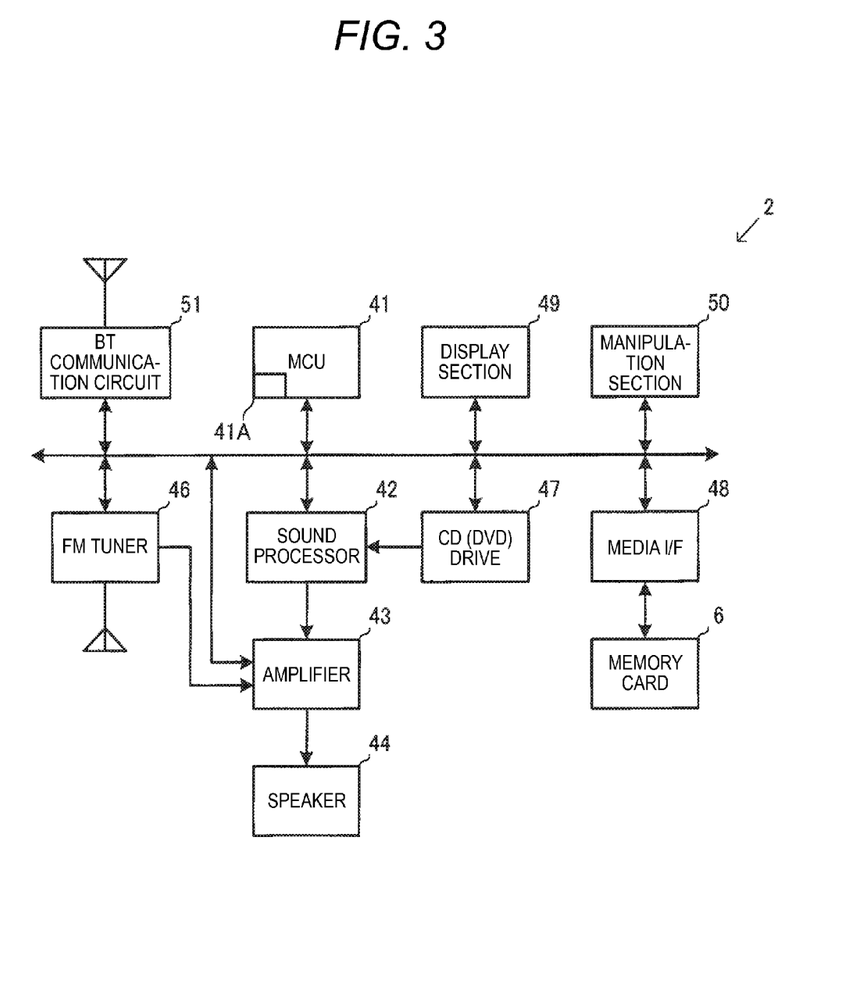
FIG. 3 is a block diagram showing a master set of the audio system.

Next, the master set 2 will be described referring to the block diagram of FIG. 3. As described above, the master set 2 is a desk top audio device and includes an MCU 41 as a control section. Furthermore, a sound processor 42, an amplifier 43, an FM tuner 46, a CD drive 47, a media interface 48, a display section 49, a manipulation section 50, and a Bluetooth communication circuit 51 are connected to the MCU 41.

The MCU 41 incorporates a memory 41A. Individual identification information for authenticating the registered mobile terminal device 1 is stored in the memory 41A. As described above, the individual identification information includes the unique number (serial number or the like), the telephone number, the numbered user name, the user's date of birth, the numerical value or character string arbitrarily set by the user, etc., assigned to the mobile terminal device 1, and all of them may be stored or only some of them may be stored. The individual identification information of the mobile terminal device 1 is written in the memory 41A by the registration processing that is performed in advance.

The master set 2 serving as a desk-top audio device has a main function of amplifying the sound processed by the sound processor 42 by using the amplifier 43, and emitting the sound from a speaker 44. The sound processor 42 is a processing section for converting a digital sound signal into a bit stream sound signal. The CD drive 47 is connected to the sound processor 42. The digital audio signal of a music file read from a memory card 6 via the media interface 48 is also input to the sound processor 42. The memory card 6, i.e., a semiconductor medium, such as an SD card or a USB memory device, is connected to the media interface 48. A plurality of music files compressed in the MP3 format or the like are stored in the memory card 6 as in the case of the memory card 5 of the mobile terminal device 1. It is herein assumed that music files including the music files stored in the memory card 5 of the mobile terminal device 1 have been stored in the memory card 6 of the master set 2. The music files stored in the memory card 5 may be synchronized with those stored in the memory card 6 by performing some kind of procedure.

In addition to the sound from the sound processor 42, the sound from the FM tuner 46 is also input to the amplifier 43. The amplifier 43 amplifies the audio signal input thereto according to the volume value specified by the MCU 41. The amplified sound signal is output to the speaker 44.

The display section 49 includes the liquid crystal display provided on the front panel and displays the current time and the title of the music piece being reproduced. The manipulation section 50 includes various kinds of buttons and a volume knob, etc. and the manipulation of the user is transmitted to the MCU 41.

The Bluetooth communication circuit 51 is a communication circuit for performing communication via Bluetooth (IEEE 802.15.1). The Bluetooth communication circuit 51 communicates with the mobile terminal device 1 or the charger 3.

Next, the charger 3 will be described referring to the block diagram of FIG. 4. The charger 3 includes an MCU 61 as a control section. A display section 62, a manipulation section 63, a power source control circuit 64, an NFC communication circuit 65, a power transmission circuit 66, and a Bluetooth communication circuit 67 are connected to the MCU 61.

The MCU 61 incorporates a memory 61A. The model identification information and individual identification information of the mobile terminal device 1 are stored in the memory 61A so that the mobile terminal device 1 serving as a communication partner is authenticated. The model identification information has been written in the memory 61A in advance at the time of shipping as the information on the model for which the charger 3 can be used, and the information is renewed as necessary through communication with the master set 2. In addition, the individual identification information is written in the memory 61A through communication with the master set 2 each time individual identification information is registered in the master set 2 or as necessary.

The individual identification information of the mobile terminal device 1 may be directly registered in the charger 3 instead of being registered in the master set 2 and then transferred to the charger 3. The charger 3 may request the individual identification information to the master set 2 each time the mobile terminal device 1 is authenticated.

The Bluetooth communication circuit 67 is a communication circuit for communicating with the master set 2 via Bluetooth (IEEE 802.15.1). The NFC communication circuit 55 is a communication circuit for performing NFC communication with the mobile terminal device 1. The NFC communication circuit 65 has the communication coil 68. As described above, the NFC communication circuit 65 is set to the card emulation mode by default.

The power source control circuit 64 is connected to the NFC communication circuit 65. The power source control circuit 64 is a circuit for turning on/off the power source of the charger 3. The power source control circuit 64 turns on/off the power source of the charger 3 according to the ON signal input from the NFC communication circuit 65 and the OFF signal input from the MCU 61.

Although the NFC communication circuit 65 operates on the power supplied via the power source control circuit 64, the circuit also operates on the power supplied by the electromagnetic wave (carrier) generated from the NFC communication circuit 15 (the communication coil 22) of the mobile terminal device 1 serving as the partner communication device.

The NFC communication circuit 65 is started by the power supplied from the NFC communication circuit 15 of the mobile terminal device 1 and inputs the ON signal to the power source control circuit 64 to turn on the power source of the charger 3 when the communication with the NFC communication circuit 15 is established. Once the power source is turned on, the NFC communication circuit 65 also operates on the power supplied from the power source circuit. Since the charger 3 is started by the power supplied from the mobile terminal device 1, the standby power thereof can be reduced to almost zero. Furthermore, it may also be possible that when the NFC communication circuit 65 begins to operate on the internal power source, the intensity of the electromagnetic wave generated from the NFC communication circuit 15 of the mobile terminal device 1 is made weak to suppress power consumption.

The power transmission circuit 66 is a circuit for generating a current having a frequency of 100 to 200 kHz and being used for noncontact power transmission and has the power-transmitting coil 69. The power-transmitting coil 69 is provided on the back side of the placement section 3A so as to be coaxial with the communication coil 68.

Although the communication coils 22 and 68, the power-transmitting coil 69 and the power-receiving coil 23 are provided separately in this embodiment, in the case that power transmission (charging) is performed at the NFC frequency, one coil may be used.

Although the display section 62 and the manipulation section 63 are not essential, they are used in the case that the charger 3 starts communication with the master set 2.

The operation to be performed when the mobile terminal device 1 is placed on the charger 3 will be described referring to the flow charts of FIGS. 5 and 6.

Figure 5:
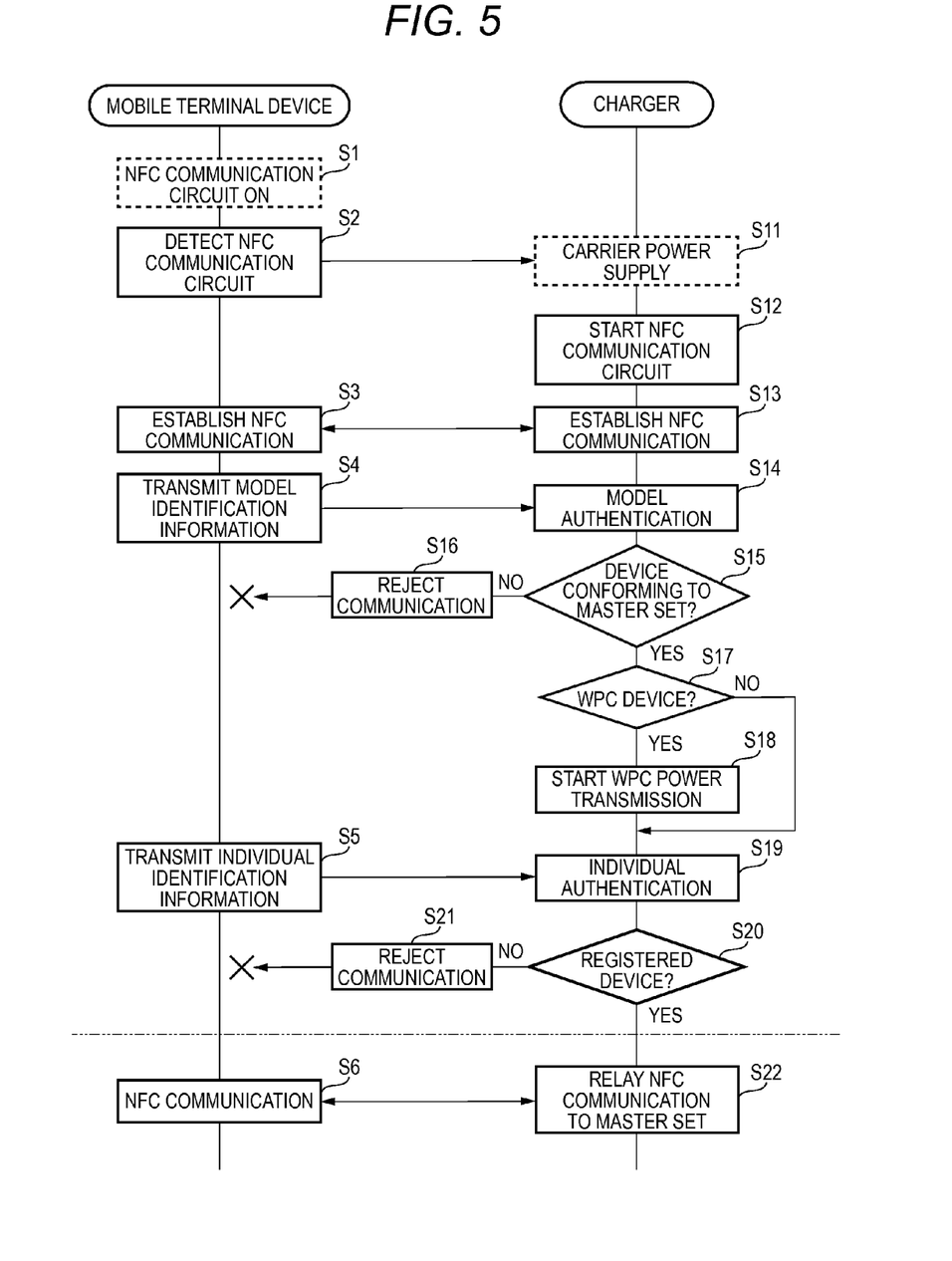
FIG. 5 is a flow chart showing a procedure for establishing communication in the audio system.

The operation shown in the flow chart of FIG. 5 is operation in which when the mobile terminal device 1 is placed on the placement section 3A of the charger 3, the mobile terminal device 1 communicates with the charger 3 via NFC, and the charger 3 relays the contents of the communication to the master set 2 via Bluetooth.

When the mobile terminal device 1 is placed on the placement section 3A of the charger 3 while the NFC communication circuit 15 is in its ON state (at S1), the NFC communication circuit 15 being in the reader/writer mode detects the NFC communication circuit 65 being in the card emulation mode (at S2). At this time, power is supplied to the NFC communication circuit 65 of the charger 3 using the 13.56 MHz electromagnetic wave transmitted from the communication coil 22 of the mobile terminal device 1 (at S11), and the NFC communication circuit 65 is started (at S12). When the NFC communication circuit 65 of the charger 3 is started, the NFC communication circuit 15 of the mobile terminal device 1 and the NFC communication circuit 65 of the charger 3 transmit identification information to each other, whereby NFC communication is established (at S3, S13). Since the NFC communication is very close proximity communication and one-to-one communication is almost ensured, the procedure for the communication establishment is simple.

Once the NFC communication between the mobile terminal device 1 and the charger 3 is established, the mobile terminal device 1 transmits the model identification information to the charger 3 (at S4). As described above, the model identification information is information, such as the vender code, the model code, etc. for identifying the mobile terminal device 1. The charger 3 authenticates the model of the mobile terminal device 1 on the basis of the model authentication information received from the mobile terminal device 1. As a result of the model authentication, the charger 3 judges whether the model of the mobile terminal device 1 is the model conforming to the communication with the master set 2 via the charger 3 (at S15) and further judges whether the model is the model conforming to WPC charging (at S17). In the case that the model of the mobile terminal device 1 is a model not conforming to the communication with the master set 2 (NO at S15), the charger 3 transmits a message indicating that the communication is rejected to the mobile terminal device 1 (at S16), and the operation is ended. At this time, the power source of the charger 3 may merely be turned off.

In the case that the model of the mobile terminal device 1 is the model conforming to the communication with the master set 2 (YES at S15) and is the model also conforming to WPC charging (YES at S17), the charger 3 starts the power transmission circuit 66, supplies a high-frequency current of 100 to 200 kHz to the power-transmitting coil 69, and starts power transmission to the power-receiving coil 23 of the mobile terminal device 1 by using electromagnetic induction (at S18). In the case that the model of the mobile terminal device 1 is the model conforming to the communication with the master set 2 (YES at S15) but is not the model conforming to WPC charging (NO at S17), the charger 3 skips the operation of S18 and advances to the process of S19.

After the model identification is ended, the mobile terminal device 1 transmits the individual identification information to the charger 3 (at S5). As described above, the individual identification information, including, for example, the telephone number and the ID of the user of the mobile terminal device 1, is information for authenticating the mobile terminal device 1 and the user of the device. The charger 3 authenticates the mobile terminal device 1 and the user on the basis of the individual identification information received from the mobile terminal device 1. As a result of the model authentication, the charger 3 judges whether the mobile terminal device 1 and the user have been registered in the master set 2 (at S20). In the case that the mobile terminal device 1 and the user have not been registered in the master set 2 (NO at S20), the charger 3 transmits a message indicating that the communication is rejected to the mobile terminal device 1 (at S21), and the operation is ended. At this time, the power source of the charger 3 may be turned off, or the operation of the power-transmitting coil 69 may be continued.

In the case that the mobile terminal device 1 and the user have been registered in the master set 2 (YES at S20), NFC communication at the application level is permitted. Hence, the mobile terminal device 1 performs communication, for example, transmits the above-mentioned setting information to the charger 3 via NFC communication (at S6), and the charger 3 relays this communication between the charger 3 and the master set 2 via Bluetooth communication (at S22). Hence, even if the mobile terminal device 1 is placed at a location away from the master set 2, communication equivalent to NFC can be performed between the mobile terminal device 1 and the master set 2. In the case that the master set 2 is in its standby state, the charger 3 may merely start the master set 2 at the timing of S22.

Figure 6:
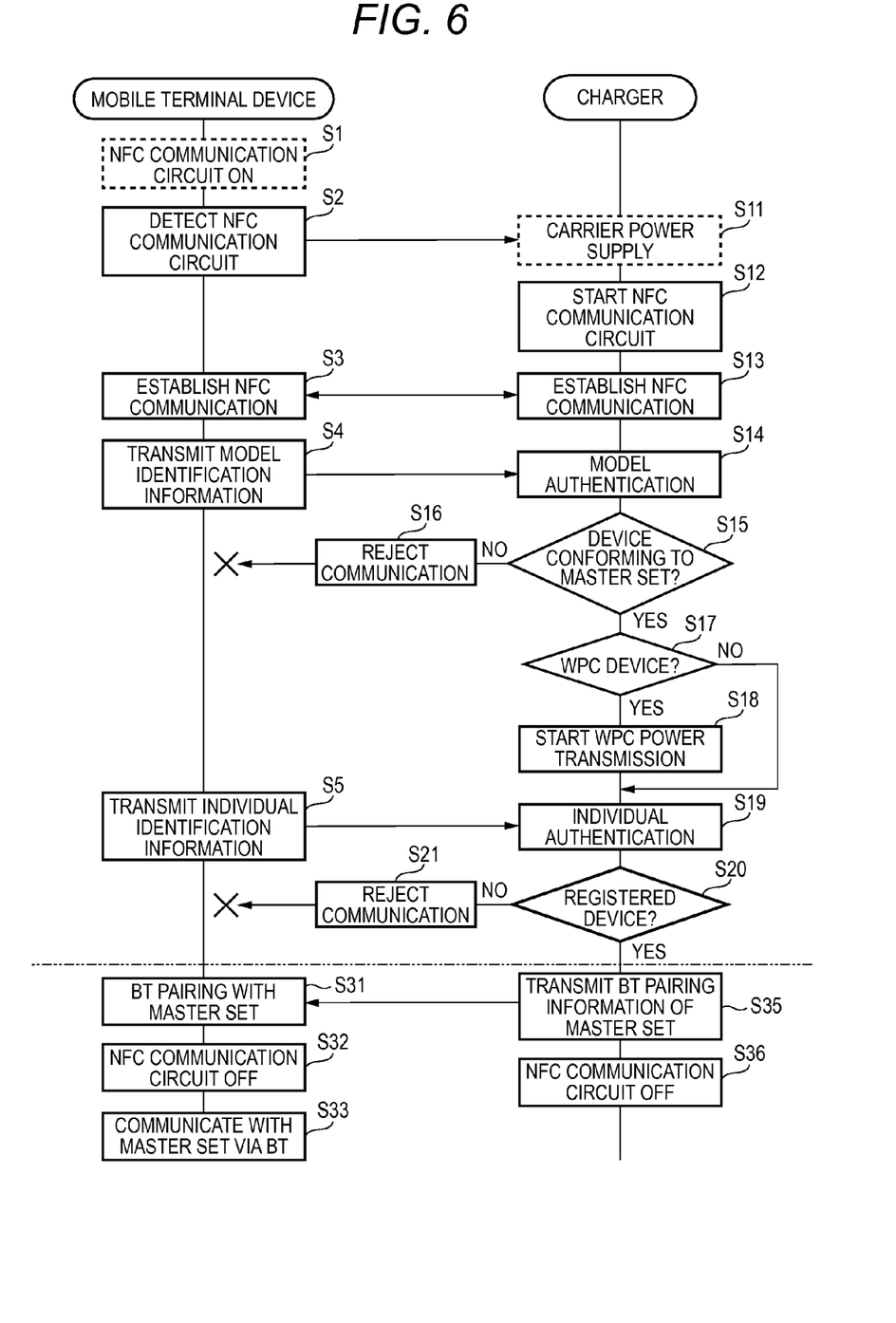
FIG. 6 is a flow chart showing another procedure for establishing communication in the audio system.

In the operation shown in the flow chart of FIG. 6, a procedure is described in which the charger 3 does not relay communication but transmits the Bluetooth pairing information of the master set 2 to the mobile terminal device 1, and the mobile terminal device 1 establishes Bluetooth communication with the master set 2 and directly performs communication. Since the procedure at S1 to S5 in the mobile terminal device 1 and the procedure at S11 to S21 in the charger 3 in FIG. 6 are the same as those shown in FIG. 5, these procedures are designated by the same step numbers, and the descriptions thereof are omitted.

In the case that the mobile terminal device 1 and the user have been registered in the master set 2 (YES at S20), the charger 3 transmits the Bluetooth pairing information of the master set 2 to the mobile terminal device 1 (at S35). The mobile terminal device 1 receives the pairing information, performs Bluetooth pairing with the master set 2, and establishes communication (at S31). Then, the mobile terminal device 1 and the charger 3 stop the operations of the NFC communication circuits 15 and 16 (at S32 and S36). The mobile terminal device 1 directly communicates with the master set 2 by using the established Bluetooth communication. By virtue of the above-mentioned operation, the NFC communication with the charger 3 is handed over to the Bluetooth communication with the master set 2, that is, communication with a different device.

Figure 7:
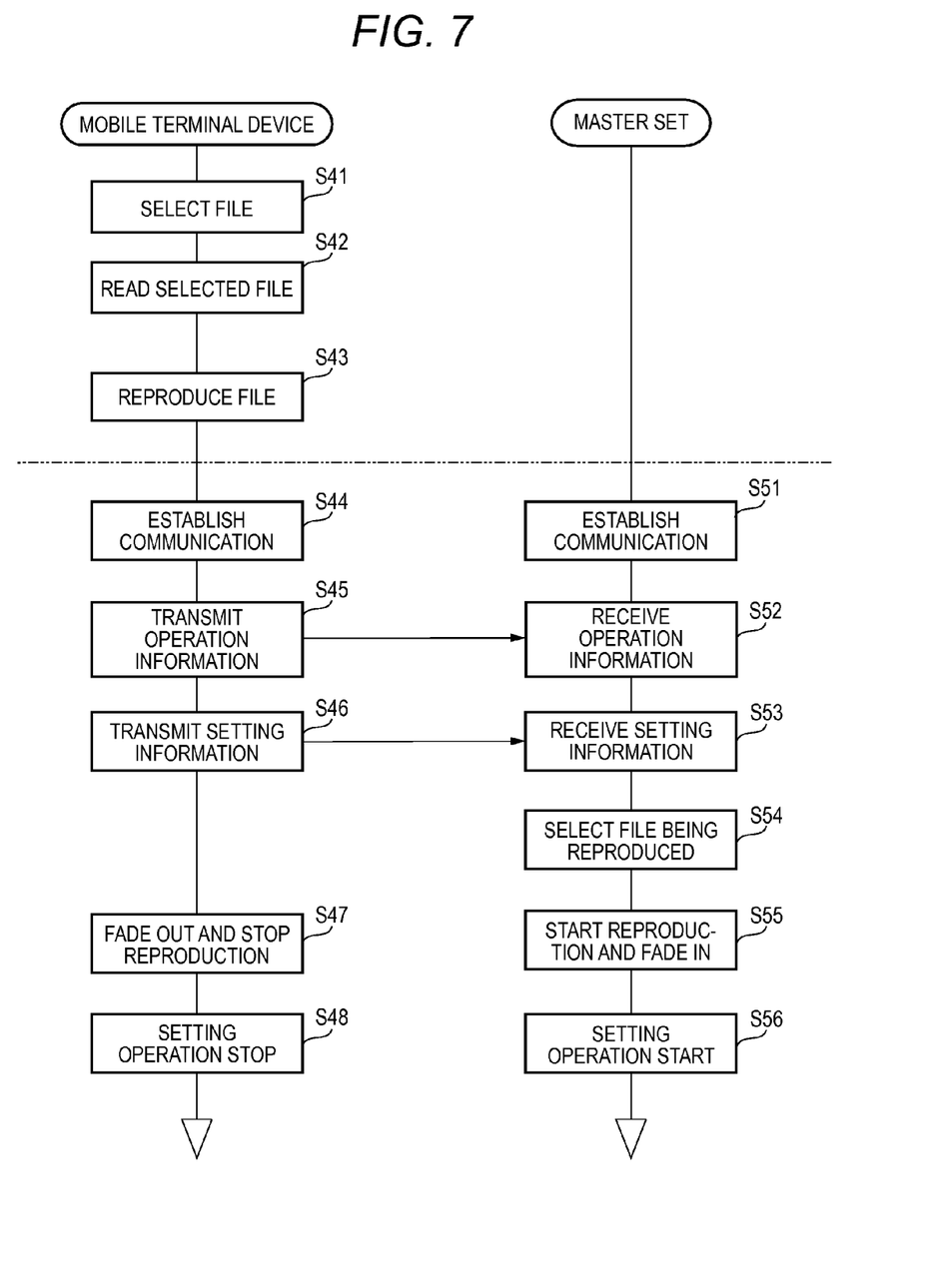
FIG. 7 is a flowchart showing a procedure for inheriting operation in the audio system.

FIG. 7 is a flow chart showing an example of a communication procedure that is performed when the mobile terminal device 1 can communicate with the master set 2 by using the relay communication described referring to FIG. 5 or the direct communication via Bluetooth described referring to FIG. 6. This flow chart shows an example of a procedure that is performed to inherit music reproducing operation from the mobile terminal device 1 to the master set 2. It is assumed that this operation is performed in such a scene as described below. The user comes home while listening to music. After coming home, the user places the mobile terminal device 1 on the placement section 3A of the charger 3. Then, the master set 2 inherits the music reproduction having been executed in the mobile terminal device 1, and the mobile terminal device 1 automatically stops the music reproduction. In other words, the music reproduction is inherited seamlessly from the mobile terminal device 1 being moved to the master set 2 located at home without requiring special manipulation by the user. Although the case in which the reproduction of a music file in the MP3 format or the like is shifted is taken as an example in the procedure shown in the flow chart of FIG. 7, the procedure is similarly applicable to, for example, a case in which the reproduction of another source, such as the reception of a radio broadcast or a television broadcast, is shifted.

The operation at steps S41 to S43 shown in FIG. 7 is performed when the mobile terminal device 1 is carried by the user. A music piece (music file) to be reproduced is selected by the manipulation of the user from among a plurality of music files stored in the memory card 5 or the like (at S41). This music selection includes the selection of one music file, the selection of an album, the selection of a music selection list made by the user, etc. After a music piece is selected by the user, the music file selected by the manipulation for the selection is read from the memory card 5 (at S42), and the digital audio signal thereof is reproduced (at S43).

When the mobile terminal device 1 being in this state is placed on the placement section 3A of the charger 3, the communication between the mobile terminal device 1 and the master set 2 is established by the relay using the charger 3 described referring to FIG. 5 or by the direct communication via Bluetooth described referring to FIG. 6 (at S44, S51). After the mutual communication is established, the mobile terminal device 1 transmits operation information and setting information to the master set 2 (at S7, S8). As described above, the operation information is information regarding the audio source being reproduced, for example, information about which position, represented by minutes and seconds, of which music file is being reproduced or information about which position (represented by minutes and seconds) of which music file of which album is being reproduced. The setting information is information about operation setting, such as the setting of alarm time.

The master set 2 receives the operation information and the setting information transmitted from the mobile terminal device 1 and stores them (at S52, S53). Then, the master set 2 reads the music file specified by the received operation information from the memory card 6 or the like (at S54), starts reproduction at the reproduction timing specified by the operation information and makes the reproduction fade in (at S55). Concurrently with this fade-in, the mobile terminal device 1 makes the reproduction of the music file fade out and stops the reproduction (at S47). Then, the mobile terminal device 1 stops the operation (for example, alarm) based on the setting information (at S48), and the master set 2 sets, for example, alarm according to the received setting information and then starts operation (at S56).

By virtue of the above-mentioned processing operation, when the mobile terminal device 1 is placed on the placement section 3A of the charger 3, the operation can be inherited from the mobile terminal device 1 to the master set 2 without requiring manipulation by the user. Hereafter, the reproduction of an audio source, such as a music file, is performed by the master set 2.

While an audio source is reproduced by the master set 2, in each case of the occurrence of a change in the reproduction of the audio source, the master set 2 transmits the change information to the mobile terminal device 1. Since the change information is sequentially transmitted to the mobile terminal device 1, when the mobile terminal device 1 is carried again by the user, the mobile terminal device 1 inherits the state of the reproduction having being performed in the master set 2 and can resume the reproduction of the audio source.

The above-mentioned case in which a change occurred in the reproduction of the audio source is a case in which an event that cannot be followed by only the passage of time occurred, for example, a case in which the music file to be reproduced is changed (the reproduction of the next music piece is started), a case in which the user performs manipulation, such as fast-forwarding, rewinding or skipping, or a case in which the audio source to be reproduced is changed (for example, the audio source is changed to a radio broadcast). Volume up/down adjustment, for example, is not included in the manipulation that causes a change in the reproduction of the audio source.

Figure 8:
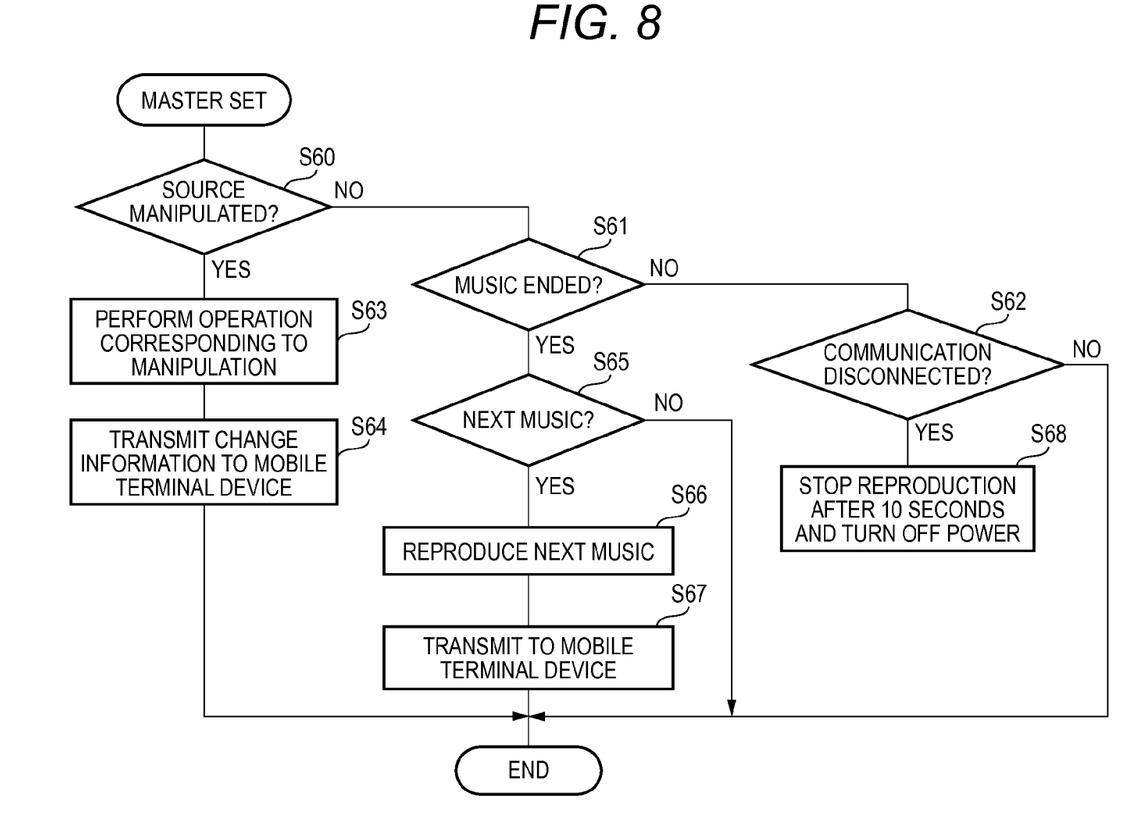
FIG. 8 is a flow chart showing operation performed by the master set during communication establishment.

FIG. 8 is a flow chart showing the operation performed by the master set 2 at the time when the mobile terminal device 1 is placed on the placement section 3A of the charger 3 and the master set 2 reproduces an audio source. This operation is performed periodically (for example, every 100 ms) between the master set 2 and the mobile terminal device 1. In the operation, monitoring is conducted as to whether the manipulation causing a change in the reproduction of the audio source is performed by the user (at S60), as to whether the reproduction of a music piece (music file) is ended (at S61), or as to whether the communication with the mobile terminal device 1 is disconnected (at S62).

In the case that the manipulation causing a change in the reproduction of the audio source is performed (YES at S60), the master set 2 performs the operation corresponding to this manipulation (at S63), and transmits the change information indicating the manipulation to the mobile terminal device 1 (at S64).

When the reproduction of the music piece is ended (YES at S61), the master set 2 judges whether the next music piece, the reproduction of which has been reserved, is present (at S65). In the case that the next music piece is present (YES at S65), the master set 2 reads the music file of the next music piece and starts reproduction (at S66). Then, the master set 2 transmits a notice (indicating the title (file name) of the next music piece and the start of the reproduction of the music piece) as the change information to the mobile terminal device 1 (at S67). On the other hand, in the case that there is no next music piece (NO at S65), the master set 2 does nothing and ends the operation. After the reproduction is ended because there is no next music piece, when, for example, manipulation for selecting a new music piece or manipulation for switching the source to a radio broadcast is performed, the manipulation is detected when the operation of S60 is performed thereafter, and the change information is transmitted to the mobile terminal device 1.

Upon detecting that the communication with the mobile terminal device 1 is disconnected (YES at S62), the master set 2 judges that the mobile terminal device 1 is carried by the user, continues the current state of the reproduction for only 10 seconds, and then stops the reproduction after the lapse of 10 seconds and turns off the power (at S68). At the time of stopping the reproduction, the volume may be faded out.

Although the reproduction operation may be stopped immediately when the communication between the master set 2 and the mobile terminal device 1 is disconnected, since it takes some time for the user to pick up the mobile terminal device 1, to insert the earphones thereof into his ears and to listen to the music piece to be reproduced, the master set 2 stops the reproduction of the music piece after approximately 10 seconds has passed after the mobile terminal device 1 is picked up from the top plate 2A (after the NFC communication is disconnected) and then turns off its own power source. It may be possible that "the manipulation that causes a change in the reproduction of the audio source" by the user is not accepted for the 10 seconds. Furthermore, it may also be possible that manipulations other than power-off manipulation are not accepted. Moreover, it may also be possible that the time (ten seconds) elapsing until the power is turned off can be selected or set by the user. In the case that the communication between the mobile terminal device 1 and the master set 2 is disconnected as described above, it is judged that the mobile terminal device 1 has been carried by the user, and the reproduction operation of the audio source is inherited again to the mobile terminal device 1.

Figure 9:
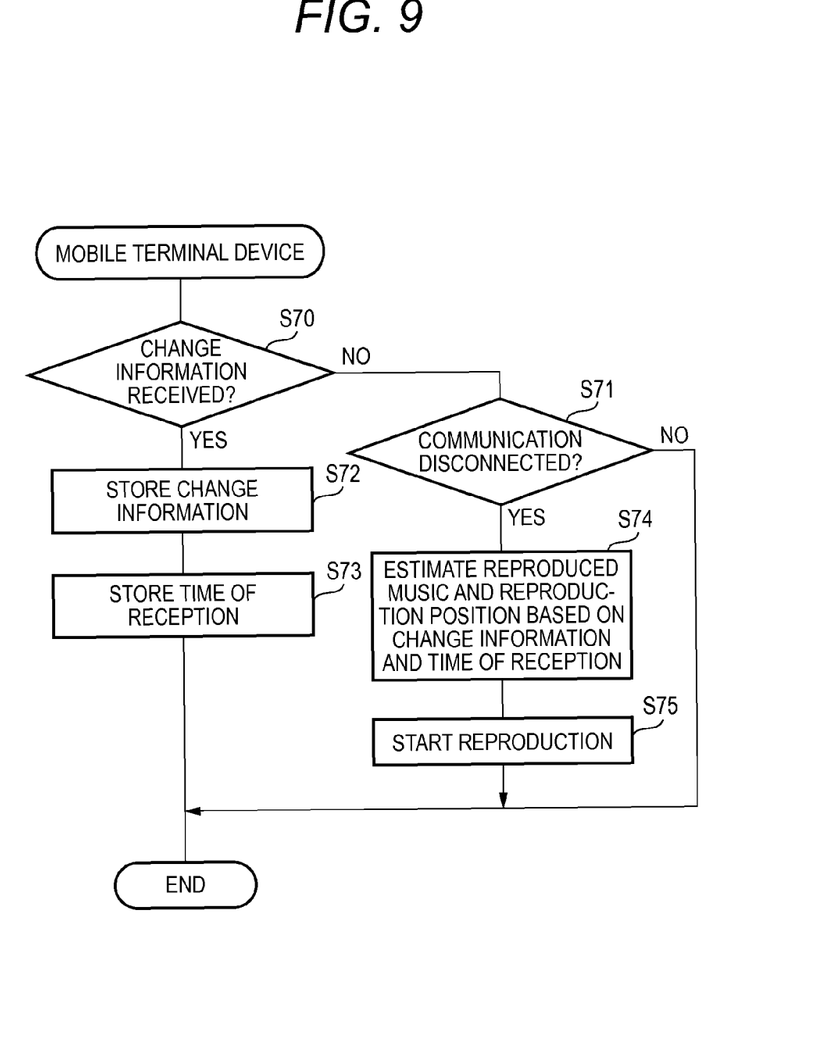
FIG. 9 is a flow chart showing operation performed by the mobile terminal device during communication establishment.

In the case that the mobile terminal device 1 communicates with the charger 3 via NFC and the charger 3 relays the communication to the master set 2 via Bluetooth, the communication therebetween is disconnected when the mobile terminal device 1 is picked up from the placement section 3A of the charger 3, and this is detected as the disconnection of the communication at S62 and S71.

On the other hand, in the case that the mobile terminal device 1 directly communicates with the master set 2 via Bluetooth, the communication therebetween is disconnected by disconnecting the Bluetooth communication with the master set 2 through the manipulation on the mobile terminal device 1 by the user, and this is detected as the disconnection of the communication at S62 and S71.

FIG. 9 is a flow chart showing the operation performed by the mobile terminal device 1 at the time when the mobile terminal device 1 is placed on the placement section 3A of the charger 3 and the master set 2 reproduces an audio source. The flow chart shows the stationary device monitoring routine of the mobile terminal device 1. This routine is executed periodically (for example, every 100 ms) when the NFC communication has been established between the mobile terminal device 1 and the master set 2. The monitoring routine monitors whether the change information transmitted from the master set 2 is received (at S70) and monitors whether the communication with the master set 2 is disconnected (at S71).

Upon receiving the change information (YES at S70), the mobile terminal device 1 stores this control information (at S72) and also stores the time of the reception in association with the control information (at S73). On the other hand, upon detecting that the communication with the master set 2 is disconnected (YES at S71), the mobile terminal device 1 estimates which timing of which music piece is reproduced by the master set 2 on the basis of the change information and the reception time of the change information (at S74), reads the music file of the music piece, and starts reproduction from the estimated position (at S75). Audio reproduction is inherited seamlessly from the master set 2 to the mobile terminal device 1 by performing the above-mentioned operation.

Although the above-mentioned procedure has been described by exemplifying a case in which the reproduction of a music file in the MP3 format or the like is shifted, the procedure is similarly applicable to a case in which the reproduction of another source, for example, the reception of a radio broadcast or a television broadcast, is shifted. For example, in the case that the user has listened to a radio broadcast (simultaneous radio) on the mobile terminal device 1, the mobile terminal device 1 may merely transmit the information on the station providing the broadcast being received as operation information at S45, and the master set 2 may merely control the FM tuner 46 so as to receive the broadcast provided by the broadcast station at S54.

The radio broadcast may be a digital radio broadcast (DAB: Digital Audio Broadcast).

The operation to be inherited seamlessly is not limited to the reproduction of audio. In the case that the alarm setting information is shifted, the master set 2 generates an alarm sound when the alarm time is reached. While the communication with the master set 2 has been established, the mobile terminal device 1 may merely stop the alarm sound.

In the case of call arrival or mail reception, the mobile terminal device 1 notifies the master set 2 of the arrival or reception, and the master set 2 generates a call arrival sound or a mail reception sound. Although the user picks up the mobile terminal device 1 from the master set 2 to respond to the call or to see the mail, even if the NFC communication is disconnected by the picking up of the device, the operations to be performed at the time of the disconnection of the communication at S71 to S74 and S75 are not performed.

With this embodiment, in preparation for the time when reproduction operation is inherited from the master set 2 to the mobile terminal device 1, in the case that a change occurred in the reproduction of an audio source in the master set 2, the change information is transmitted to the mobile terminal device 1; however, the state of the operation may be transferred not only in the case that a change occurred in the reproduction of the audio source but also periodically.

In addition, the shape of the charger 3 is not limited to a tray shape. For example, the charger 3 may have the shape of a hook to which the mobile terminal device 1 is hooked or the shape of a stand against which the device is leaned. Furthermore, the term "proximity" in the present invention refers to not only a state in which the mobile terminal device 1 is placed on such a placement section but also a state in which the device is brought close thereto to the extent that NFC communication can be performed although the device is not placed thereon.

The high-speed communication according to the present invention is not limited to Bluetooth. Wi-Fi or wired communication may also be used. For example, power line communication (PLC) may also be used.

The mobile terminal device 1 is not limited to a multi-functional phone (smart phone), but a mobile audio player, a tablet terminal, a mobile information terminal (PDA: Personal Digital Assistant), etc. may also be used.

Programs describing the processing performed in the charger 3 (or the processing performed in the MCU 61) can be stored in recording media, such as a magnetic disk, an optical disk, a magneto-optical disk and a semiconductor memory, and distributed, or can also be distributed using electric communication lines, such as the Internet.

The present application is based on Japanese Patent Application (JP2012-201288) filed on Sep. 13, 2012, and the contents thereof are herein incorporated by reference.

DESCRIPTION OF REFERENCE NUMERALS AND SIGNS

1 mobile terminal device (first device)
2 master set (second device)
3 charger (third device)
3A placement section
14, 51, 67 Bluetooth communication circuit
15, 65 NFC communication circuit

The invention claimed is:

1. A proximity communication system comprising:
a first device which is configured to reproduce audio data, the first device including a first proximity communication section which is configured to perform proximity communication; and
a third device which includes:
a second proximity communication section which is configured to perform proximity communication;
a high-speed communication section which is configured to perform high-speed communication, which is faster than the proximity communication, with a second device which is configured to reproduce the audio data;
a storage section in which authentication information for authenticating the first device is stored; and
a control section which is configured to authenticate the first device by using the authentication information when the second proximity communication section starts communication with the first proximity communication section of the first device, and which is configured to relay communication between the first device and the second device by using the second proximity communication section and the high-speed communication section in response to the authentication being successful, wherein
when the communication between the first device and the second device is relayed by the third device, a control section of the first device transmits, to the second device via the third device, at least one of operation information indicating an operation state at a time when the communication between the first device and the second device is relayed by the third device and setting information indicating a function setting state at the time,
when receiving the at least one of the operation information and the setting information, a control section of the second device starts operation based on the received information, and
the control section of the first device stops operation based on the information transmitted to the second device.

2. A proximity communication apparatus comprising:
a proximity communication section which is configured to perform proximity communication;
a high-speed communication section which is configured to perform high-speed communication, which is faster than the proximity communication, with a second device which is configured to reproduce audio data;
a storage section in which authentication information for authenticating a mobile terminal device which is configured to reproduce the audio data and includes a communication section that communicates with the proximity communication section is stored; and
a control section which is configured to authenticate the mobile terminal device by using the authentication information when the proximity communication section starts communication with the communication section of the mobile terminal device, and which is configured to relay, by using the proximity communication section and the high-speed communication section, communication between the mobile terminal device and the second device in response to the authentication being successful, wherein
when the communication between the mobile terminal device and the second device is relayed by the control section, a control section of the mobile terminal device transmits, to the second device via the control section, at least one of operation information indicating an operation state at a time when the communication between the mobile terminal device and the second device is relayed by the control section and setting information indicating a function setting state at the time,
when receiving the at least one of the operation information and the setting information, a control section of the second device starts operation based on the received information, and
the control section of the mobile terminal device stops operation based on the information transmitted to the second device.

3. The proximity communication apparatus according to claim 2, further comprising: a power transmission section which is configured to wirelessly supply power to the mobile terminal device.

4. A method of controlling a proximity communication apparatus including: a proximity communication section which is configured to perform proximity communication; a high-speed communication section which is configured to perform high-speed communication, which is faster than the proximity communication, with a second device which is configured to reproduce audio data; and a storage section in which authentication information for authenticating a mobile terminal device which is configured to reproduce the audio data and includes a communication section that communicates with the proximity communication section is stored, the method comprising:
- authenticating the mobile terminal device by using the authentication information when the proximity communication section starts communication with the communication section of the mobile terminal device; and
- relaying, by using the proximity communication section and the high-speed communication section, communication between the mobile terminal device and the second device in response to the authentication being successful, wherein
- when the communication between the mobile terminal device and the second device is relayed by the proximity communication section and the high-speed communication section, a control section of the mobile terminal device transmits, to the second device via the proximity communication section and the high-speed communication section, at least one of operation information indicating an operation state at a time when the communication between the mobile terminal device and the second device is relayed by the proximity communication section and the high-speed communication section and setting information indicating a function setting state at the time,
- when receiving the at least one of the operation information and the setting information, a control section of the second device starts operation based on the received information, and
- the control section of the mobile terminal device stops operation based on the information transmitted to the second device.

* * * * *